(12) United States Patent
Lu

(10) Patent No.: US 11,316,717 B2
(45) Date of Patent: Apr. 26, 2022

(54) ERROR CORRECTION METHOD AND APPARATUS

(71) Applicant: HUAWEI TECHNOLOGIES CO., LTD., Guangdong (CN)

(72) Inventor: Yuchun Lu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/077,907

(22) Filed: Oct. 22, 2020

(65) Prior Publication Data

US 2021/0044462 A1 Feb. 11, 2021

Related U.S. Application Data

(63) Continuation of application No. PCT/CN2019/080989, filed on Apr. 2, 2019.

(30) Foreign Application Priority Data

Apr. 23, 2018 (CN) .......................... 201810367346.3

(51) Int. Cl.
H04L 1/00 (2006.01)
H04L 25/03 (2006.01)
H04L 7/00 (2006.01)

(52) U.S. Cl.
CPC ...... *H04L 25/03057* (2013.01); *H04L 1/0054* (2013.01); *H04L 7/0062* (2013.01); *H04L 25/03343* (2013.01); *H04L 2025/0349* (2013.01)

(58) Field of Classification Search
CPC ............. H04L 25/03057; H04L 1/0054; H04L 7/0062; H04L 25/03343; H04L 2025/0349
See application file for complete search history.

(56) References Cited

U.S. PATENT DOCUMENTS 6,167,082 A * 12/2000 Ling ................. H04L 25/03057
                                                        333/28 R
9,258,155 B1 * 2/2016 Riani ................ H04L 25/03057
(Continued)

FOREIGN PATENT DOCUMENTS

CN 101123596 A 2/2008
CN 101174914 A 5/2008
(Continued)

OTHER PUBLICATIONS

Bhoja, "PAM4 Signaling for intra-data center and Data center to data center connectivity (DCI)," Optical Fiber Communication Conference, Feb. 20, 2017, 54 pages.
(Continued)

Primary Examiner — Janice N Tieu
(74) Attorney, Agent, or Firm — Fish & Richardson P.C.

(57) ABSTRACT

Methods, systems, and apparatus for error correction are provided. In one aspect, an error correction method includes: obtaining an output signal and an amplitude value of a feed forward equalizer (FFE), the amplitude value being a channel response amplitude value corresponding to an equivalent channel of the FFE, performing level decision on the output signal based on the amplitude value to obtain a first decision signal including (2M−1) decision symbols, M being an integer not less than 2, performing (1/(1+D)) decoding on the first decision signal to obtain a first decoded signal, determining a second decision signal based on the first decoded signal, the second decision signal including (M−1) decision symbols, determining that a burst error occurs in the second decision signal if an absolute value of the second decision signal is greater than (M−1), and correcting the burst error in the second decision signal.

20 Claims, 9 Drawing Sheets

(56) References Cited

U.S. PATENT DOCUMENTS

| | | | |
|---|---|---|---|
| 10,382,047 B1* | 8/2019 | Li | H04L 25/0307 |
| 2003/0035495 A1* | 2/2003 | Laamanen | H04L 25/03343 |
| | | | 375/296 |
| 2012/0230385 A1 | 9/2012 | Currivan et al. | |
| 2014/0307172 A1 | 10/2014 | Yang | |
| 2016/0050088 A1* | 2/2016 | Eliaz | H04L 1/005 |
| | | | 375/340 |

FOREIGN PATENT DOCUMENTS

| | | |
|---|---|---|
| CN | 101964765 A | 2/2011 |
| CN | 102882817 A | 1/2013 |
| CN | 103634248 A | 3/2014 |
| CN | 107786305 A | 3/2018 |
| CN | 109873777 A | 6/2019 |
| CN | 110417536 A | 11/2019 |

OTHER PUBLICATIONS

Extended European Search Report in European Application No. 19791587.9, dated Apr. 30, 2021, 6 pages.

Yan-Zi et al., "Researches of FEC in the 100Gb/s system, Optical Communication Technology", Feb. 2012, 3 pages (With English Abstract).

Office Action issued in Chinese Application No. 201810367346.3 dated Apr. 24, 2020, 9 pages (With English Translation).

PCT International Search Report and Written Opinion in International Application PCT/CN2019/080,989, dated Jun. 14, 2019, 15 pages (With English Translation).

* cited by examiner

ERROR CORRECTION METHOD AND APPARATUS

CROSS-REFERENCE TO RELATED APPLICATIONS

This application is a continuation of International Application No. PCT/CN2019/080989, filed on Apr. 2, 2019, which claims priority to Chinese Patent Application No. 201810367346.3, filed on Apr. 23, 2018. The disclosures of the aforementioned applications are hereby incorporated by reference in their entireties.

TECHNICAL FIELD

This application relates to the field of communications technologies, and in particular, to an error correction method and apparatus.

BACKGROUND

A high-speed link technology is an elementary technology between a chip and an interface. High-speed links include a high-speed electrical link and a high-speed optical link. Intersymbol interference (inter symbol interference, ISI) exists in both the high-speed electrical link and high-speed optical link. ISI adversely affects signal transmission. To overcome the adverse impact of ISI, the ISI is usually filtered out by using an equalizer.

Previously, the equalizer has a decision feedback structure. In other words, a decision result of a previous input signal in the equalizer is used to equalize a current input signal, to obtain a decision result of the current input signal, and finally the decision result is used as an equalized output signal for output.

Similar to most electronic devices, the equalizer may also incorrectly determine a signal sometimes. When a bit error occurs, because of the decision feedback structure, the bit error not only affects incorrect determining of a next signal, but also causes bit error transmission. Therefore, this causes incorrect determining of a large number of signals, and a bit error rate of the equalizer is relatively high.

SUMMARY

In view of this, a first aspect of embodiments of this application provides an error correction method, including: obtaining an output signal and an amplitude value of a feed forward equalizer FFE, where the amplitude value is a channel response amplitude value corresponding to an equivalent channel of the FFE; performing level decision on the output signal based on the amplitude value to obtain a first decision signal, where the first decision signal includes (2M−1) decision symbols, and M is an integer not less than 2; performing (1/(1+D)) decoding on the first decision signal to obtain a first decoded signal, and determining the first decoded signal as a second decision signal, where the second decision signal includes (M−1) decision symbols; if an absolute value of the second decision signal is greater than (M−1), determining that a burst error occurs in the second decision signal; and correcting the burst error in the second decision signal to obtain a corrected second decision signal.

It can be learned from the foregoing technical solution that the embodiments of this application have the following advantages: The error correction method provided in the embodiments of this application detects the burst error in the second decision signal based on the absolute value of the second decision signal, and corrects the burst error to obtain the corrected second decision signal. This method reduces a bit error rate of the FFE and improves equalization performance. In an implementation of the first aspect, if the absolute value of the second decision signal is greater than (M−1), the method further includes: if a level value of the second decision signal is negative, selecting (−(M−1)) as a decision symbol in a symbol period in which the burst error occurs, where (−(M−1)) is a decision symbol with a minimum level value in the second decision signal; or if a level value of the second decision signal is positive, selecting (+(M−1)) as a decision symbol in a symbol period in which the burst error occurs, where (+(M−1)) is a decision symbol with a maximum level value in the second decision signal.

In an implementation of the first aspect, if the absolute value of the second decision signal is greater than (M−1), the method further includes: determining a symbol location of the second decision signal whose absolute value is greater than (M−1) as a symbol location at which the burst error ends; and the correcting the burst error in the second decision signal includes: performing backtracking and error correction on a decision symbol in a $J^{th}$ symbol period in the second decision signal based on the symbol location at which the burst error ends, so as to correct the decision symbol in the $J^{th}$ symbol period in the second decision signal, where J is a preset backtracking depth and an integer greater than 1.

In an implementation of the first aspect, the performing backtracking and error correction on a decision symbol in a $J^{th}$ symbol period in the second decision signal based on the symbol location at which the burst error ends includes: performing, based on the output signal and the amplitude value and by using a maximum likelihood sequence estimation MLSE algorithm, backtracking and error correction on the decision symbol in the $J^{th}$ symbol period in the second decision signal starting from the symbol location at which the burst error ends.

In an implementation of the first aspect, the performing backtracking and error correction on a decision symbol in a $J^{th}$ symbol period in the second decision signal based on the symbol location at which the burst error ends includes: performing, based on an error control coding ECC codeword of the output signal, backtracking and error correction on the decision symbol in the $J^{th}$ symbol period in the second decision signal starting from the symbol location at which the burst error ends.

In an implementation of the first aspect, an input signal of the FFE is a (1/(1+D)) precoded signal, and the performing (1/(1+D)) decoding on the first decision signal to obtain a first decoded signal, and determining the first decoded signal as a second decision signal (where the second decision signal includes (M−1) decision symbols) includes: performing (1/(1+D)) decoding on the first decision signal to obtain the first decoded signal; performing (1+D) decoding on the first decoded signal to obtain a second decoded signal; determining the second decoded signal as the second decision signal; correspondingly, the correcting the burst error in the second decision signal includes: obtaining a symbol location at which the burst error ends and an error flag symbol, where the symbol location at which the burst error ends is a symbol location at which the burst error occurs in the second decision signal, and the error flag symbol is used to indicate an error type of the burst error; and performing backtracking and error correction on a decision symbol in a $J^{th}$ symbol period in the second decision signal based on the error flag symbol and starting from the symbol location at which the burst error ends, so as to correct the decision symbol in the $J^{th}$ symbol period in the second decision signal, where J is a preset backtracking depth and an integer greater than 1.

In the foregoing several implementations of the error correction method, backtracking and error correction are performed only when the burst error occurs. This can effectively reduce power consumption of an error correction apparatus. It is easily understood that a lower error rate leads to less power consumption. Using the MLSE algorithm and ECC codeword to perform backtracking and error correction can improve the accuracy of correcting burst errors and improve the error correction accuracy of the error correction apparatus.

In an implementation of the first aspect, the output signal is any one of a pulse amplitude modulation PAM signal, a quadrature phase shift keying QPSK signal, and a quadrature amplitude modulation QAM signal.

A second aspect of the embodiments of this application provides an error correction apparatus, including: an obtaining module, configured to obtain an output signal and an amplitude value of a feed forward equalizer FFE, where the amplitude value is a channel response amplitude value corresponding to an equivalent channel of the FFE; a decision module, configured to perform level decision on the output signal based on the amplitude value to obtain a first decision signal, where the first decision signal includes (2M−1) decision symbols, and M is an integer not less than 2; a decoding module, configured to perform (1/(1+D)) decoding on the first decision signal to obtain a first decoded signal, and determine the first decoded signal as a second decision signal, where the second decision signal includes (M−1) decision symbols; a determining module, configured to determine, if an absolute value of the second decision signal is greater than (M−1), that a burst error occurs in the second decision signal; and an error correction module, configured to correct the burst error in the second decision signal when determining that the burst error occurs in the second decision signal.

In an implementation of the second aspect, the error correction apparatus further includes: a selection module, where the selecting module is configured to: if a level value of the second decision signal is negative, select (−(M−1)) as a decision symbol in a symbol period in which the burst error occurs, where (−(M−1)) is a decision symbol with a minimum level value in the second decision signal; or if a level value of the second decision signal is positive, select (+(M−1)) as a decision symbol in a symbol period in which the burst error occurs, where (+(M−1)) is a decision symbol with a maximum level value in the second decision signal.

In an implementation of the second aspect, the determining module is further configured to: determine a symbol location of the second decision signal whose absolute value is greater than (M−1) as a symbol location at which the burst error ends; and the error correction unit is specifically configured to perform backtracking and error correction on a decision symbol in a $J^{th}$ symbol period in the second decision signal based on the symbol location at which the burst error ends, so as to correct the decision symbol in the $J^{th}$ symbol period in the second decision signal, where J is a preset backtracking depth and an integer greater than 1.

In an implementation of the second aspect, the error correction module is specifically configured to perform, based on the output signal and the amplitude value and by using a maximum likelihood sequence estimation MLSE algorithm, backtracking and error correction on the decision symbol in the $J^{th}$ symbol period in the second decision signal starting from the symbol location at which the burst error ends.

In an implementation of the second aspect, the error correction module is specifically configured to perform, based on an error control coding ECC codeword of the output signal, backtracking and error correction on the decision symbol in the $J^{th}$ symbol period in the second decision signal starting from the symbol location at which the burst error ends.

In an implementation of the second aspect, an input signal of the FFE is a (1/(1+D)) precoded signal, and the decoding module is specifically configured to perform (1/(1+D)) decoding on the first decision signal to obtain the first decoded signal; perform (1+D) decoding on the first decoded signal to obtain a second decoded signal; and determine the second decoded signal as the second decision signal; the error correction module is specifically configured to: obtain a symbol location at which the burst error ends and an error flag symbol, where the symbol location at which the burst error ends is a symbol location at which the burst error occurs in the second decision signal, and the error flag symbol is used to indicate an error type of the burst error: and perform backtracking and error correction on a decision symbol in a $J^{th}$ symbol period in the second decision signal based on the error flag symbol and starting from the symbol location at which the burst error ends, so as to correct the decision symbol in the $J^{th}$ symbol period in the second decision signal, where J is a preset backtracking depth and an integer greater than 1.

In an implementation of the second aspect, the output signal is any one of a pulse amplitude modulation PAM signal, a quadrature phase shift keying QPSK signal, and a quadrature amplitude modulation QAM signal.

A third aspect of the embodiments of this application provides an error correction apparatus, including: a storage unit and a processing unit, where the storage unit is configured to store an operation instruction; and the processing unit is configured to invoke the operation instruction to execute the error correction method according to any one of implementations of the first aspect.

A fourth aspect of the embodiments of this application provides a computer storage medium, where when the operation instruction runs on a computer, the computer is enabled to execute the error correction method according to any one of implementations of the first aspect.

A fifth aspect of the embodiments of this application provides a computer program product, and when the computer program product runs on a computer, the computer is enabled to execute the error correction method according to any one of implementations of the first aspect.

Effects corresponding to the second aspect to the fifth aspect are similar to those of the first aspect. For details, refer to related descriptions in the first aspect. Details are not described herein again.

DESCRIPTION OF EMBODIMENTS

Embodiments of this application provide an error correction method and apparatus, to reduce a bit error rate of an FFE and improve equalization performance.

The following clearly and completely describes the technical solutions in this application with reference to the accompanying drawings in this application. Apparently, the described embodiments are merely a part rather than all of the embodiments of this application.

In the specification, claims, and accompanying drawings of this application, the terms "first", "second". "third", "fourth", and so on (if used) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
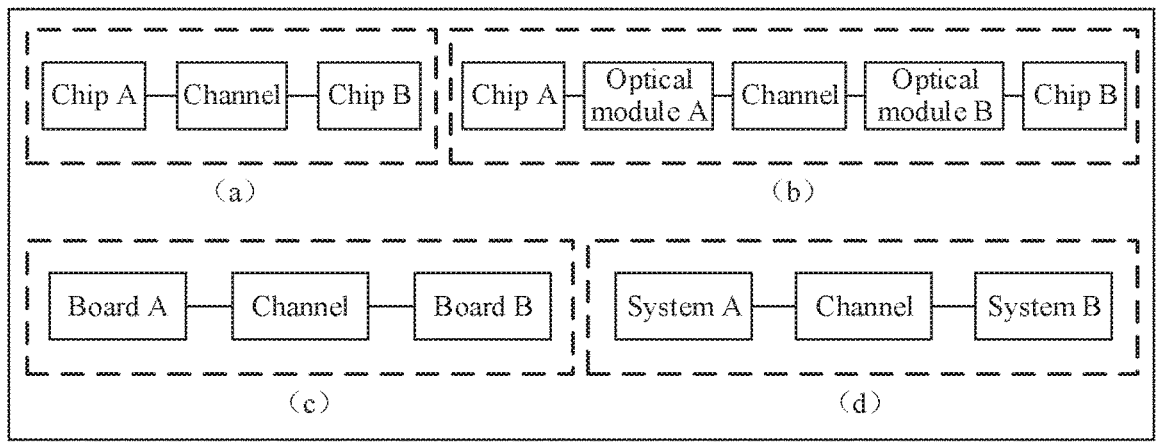
FIG. 1 is a schematic diagram of a high-speed interconnected link according to an embodiment of this application.

The error correction method and apparatus in the embodiments of this application are applicable to an application scenario in which high-speed interconnection is required. FIG. 1 is a schematic diagram of a high-speed interconnected link according to an embodiment of this application. (a) in FIG. 1 shows an interconnected link between chips connected using a channel. (b) in FIG. 1 shows interconnected links between a chip and an optical module, and between an optical module and a chip connected using a channel. (c) in FIG. 1 shows an interconnected link between boards connected by using a channel. (d) in FIG. 1 shows an interconnected link between systems connected by using a channel. In the four types of interconnected links, a link may be an electrical link, for example, a printed circuit board (printed circuit board, PCB), or may be an optical link or a radio link. The system may be a terminal device such as a general-purpose computer, a router, a switch, or a mobile phone.

Figure 2:
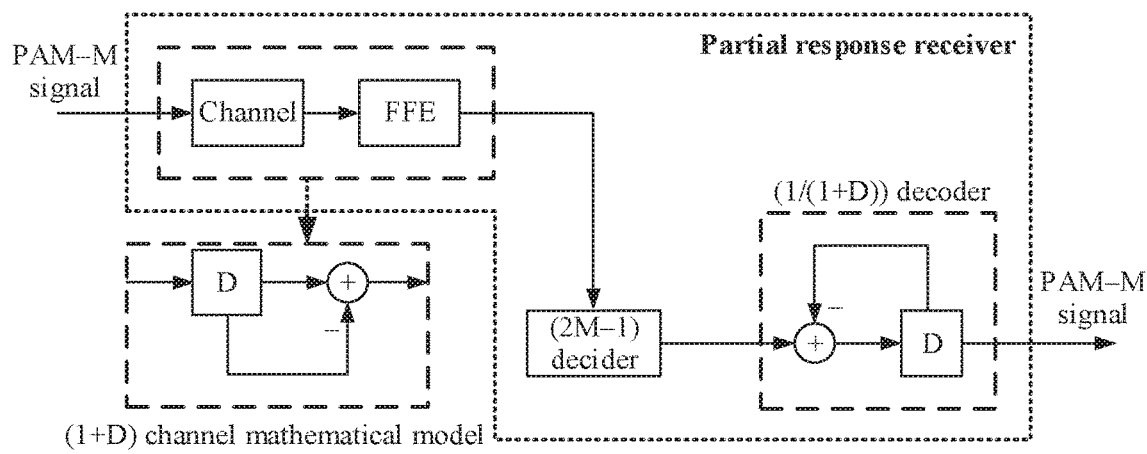
FIG. 2 is a schematic diagram of a basic structure of a partial response receiver according to an embodiment of this application.

The embodiments of this application provide an error correction apparatus based on a partial response (partial response) receiver solution. The error correction apparatus may specifically be a nonlinear error correction (nonlinear error correction, NEC) apparatus that is configured to correct a burst error of a feed forward equalizer (feed forward equalizer, FFE), to reduce a bit error rate of the FFE and improve equalization performance. FIG. 2 is a schematic diagram of a basic structure of a partial response partial response receiver according to an embodiment of this application. As shown in FIG. 2, after a PAM-M signal passes through a channel and an FFE, the FFE outputs a PAM-(2M−1) signal, a (2M−1) decider performs level decision on the PAM-(2M−1) signal, and a (1/(1+D)) decoder decodes the PAM-(2M−1) signal to obtain the PAM-M signal. The channel and the FFE are equivalent to a (1+D) channel. FIG. 2 shows a mathematical model of the (1+D) channel. A function of the FFE is equivalent to performing (1+D) encoding on the PAM-M signal and performing decoding by using the (1/(1+D)) decoder to restore the PAM-M signal. The PAM-M signal is a pulse amplitude modulation (pulse amplitude modulation, PAM) signal including M decision symbols, and M is an integer greater than or equal to 2. Similarly, the PAM-(2M−1) signal is a PAM signal including (2×M−1) decision symbols.

Figure 3:
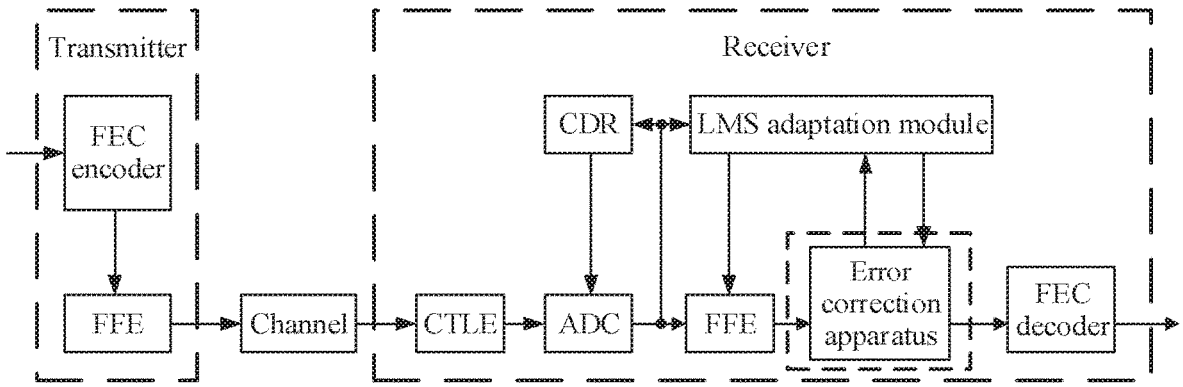
FIG. 3 is a schematic diagram of a structure of a high-speed receiver according to an embodiment of this application.

For example, the error correction apparatus in the embodiments of this application may be applicable to a high-speed optical/electrical link receiver. FIG. 3 is a schematic diagram of a structure of a high-speed receiver according to an embodiment of this application. Principles of the basic structure of the receiver shown in FIG. 3 are similar to principles of the partial response receiver solution shown in FIG. 2. FIG. 3 shows a transceiver architecture based on a continuous time linear equalizer (continuous time linear equalization, CTLE), an FFE, and an error correction apparatus. In the transceiver architecture, a transmitter includes the FFE and a forward error correction (forward error correction, FEC) encoder. After a signal is input into the transmitter, the FFE in the transmitter outputs the signal to a channel, and the signal is input into the receiver through the channel. Compared with a conventional receiver, the receiver uses an error correction apparatus provided in the embodiments of this application. The receiver may include a clock and data recovery (clock and data recovery, CDR) module, a least mean square (least mean square, LMS) adaptation module, the CTLE, an analog-to-digital converter (analog to digital converter, ADC), the FFE, the FEC decoder, and the error correction apparatus. Arrows in FIG. 3 indicate signal flow directions between the modules.

The high-speed link receiver may be applicable to any system that requires high-speed serial communications interfaces. The high-speed serial communications interfaces include a chip Ser/Des interface, a CDR chip in an optical module, an Ethernet interface, an optical transport network (optical transport network. OTN) interface, a peripheral component interconnect express (peripheral component interconnect express, PCIE) interface, a general-purpose computer interface, a mobile phone interface, and the like.

Figure 4:
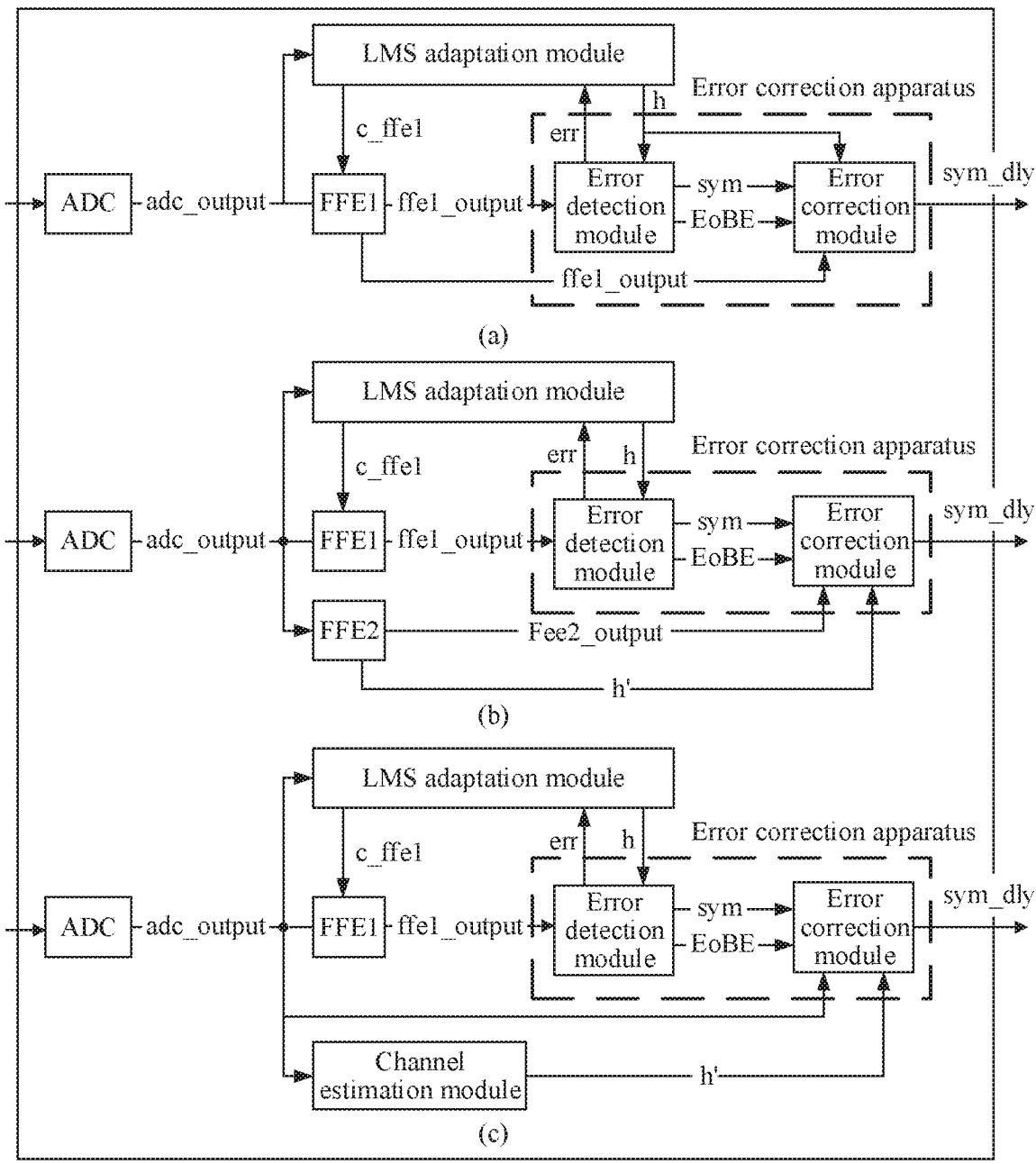
FIG. 4 is a schematic diagram of external connections of an error correction apparatus according to an embodiment of this application.

FIG. 4 is a schematic diagram of external connections of an error correction apparatus according to an embodiment of this application. FIG. 4 shows an internal structure of the error correction apparatus and three external connection manners of the error correction apparatus. The error correction apparatus includes an error detection module and an error correction module. The error detection module is configured to detect a burst error in a signal output by a feed forward equalizer FFE 1. The error correction module is configured to correct the burst error when the error detection module detects the burst error, to obtain a corrected FFE 1 output signal. (a), (b), and (c) in FIG. 4 respectively show three external connection manners of the error correction apparatus. A difference lies in that the error correction module obtains an input signal from the outside of the error correction apparatus in different manners. In (a) in FIG. 4, the error correction module obtains the input signal from the FFE 1. In (b) in FIG. 4, the error correction module obtains the input signal from another feed forward equalizer FFE 2. In (c) in FIG. 4, the error correction module obtains the input signal from an LMS adaptation module and an ADC. Arrows in FIG. 4 indicate signal flow directions. adc_output is an output signal from the ADC. ffe1_output is an output signal from the FFE 1. ffe2_output is an output signal from the FFE 2. sym is a decision signal from the error detection module. EoBE is a corresponding flag signal when the error detection module detects a burst error. err is a difference between the ffe1_output signal and a first decision signal. The first decision signal is obtained by performing level decision on the ffe1_output signal. h is a channel response amplitude value of an FFE 1 equivalent channel obtained through calculation by the LMS adaptation module. h' is an amplitude value used by the error correction module to perform error correction and may be obtained from a channel estimation module or the FFE 2. c_fee1 is an equalizer coefficient of the FFE 1. sym_dly is a corrected decision signal obtained after the error correction module corrects the sym signal. sym is the decision signal obtained by the error detection module.

To facilitate understanding of the error correction method provided in the embodiments of this application, the following describes the error correction method provided in the embodiments of this application in detail with reference to specific embodiments.

Figure 5:
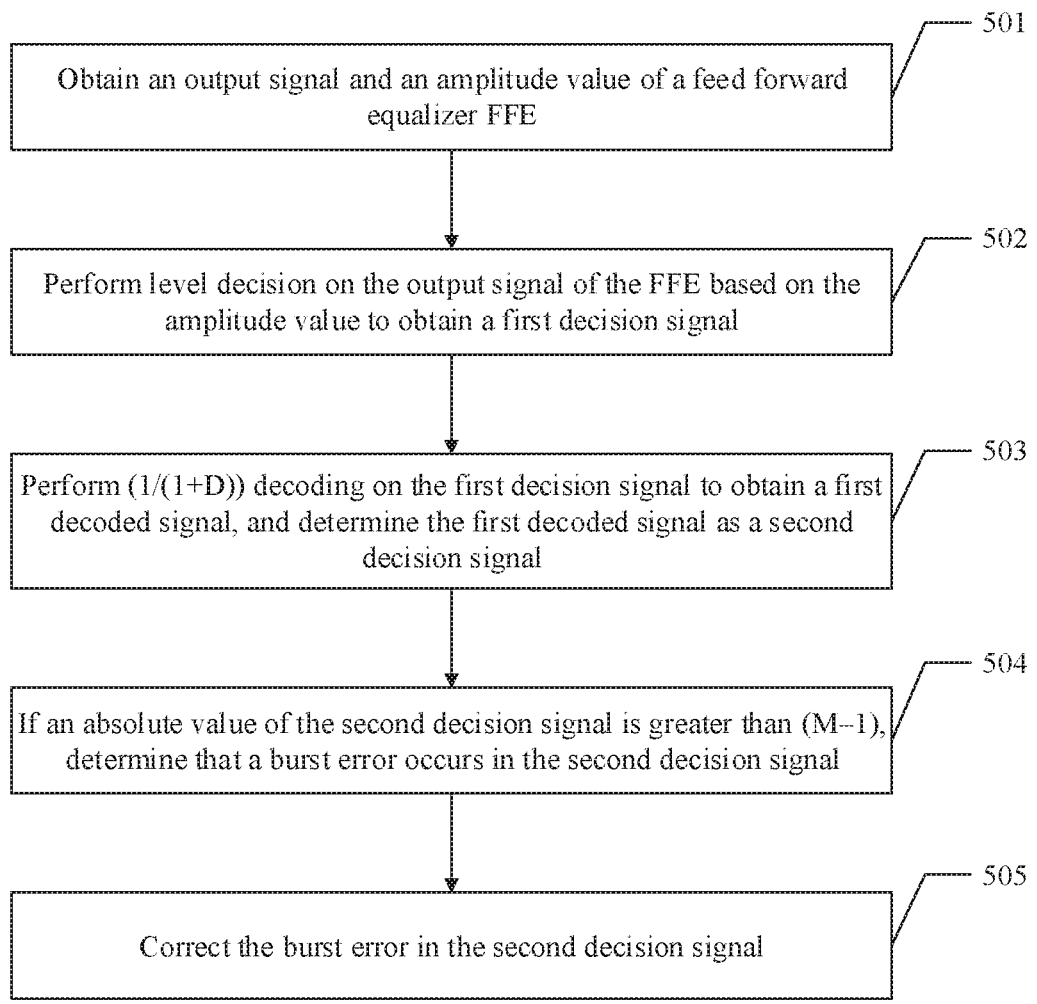
FIG. 5 is a flowchart of an error correction method according to an embodiment of this application.

FIG. 5 is a flowchart of an error correction method according to an embodiment of this application. As shown in FIG. 5, the error correction method includes the following steps.

501: Obtain an output signal and an amplitude value of a feed forward equalizer FFE.

The amplitude value is a channel response amplitude value corresponding to an equivalent channel of the FFE. As described in the foregoing description of FIG. 1, the equivalent channel of the FFE may be a (1+D) channel.

In an example, the output signal may be any one of a PAM signal, a quadrature phase shift keying (quadrature phase shift Keying, QPSK) signal, a quadrature amplitude modulation (quadrature amplitude modulation, QAM) signal, or another signal.

502: Perform level decision on the output signal based on the amplitude value to obtain a first decision signal.

In an example, the level decision may be (2M−1) level decision, to be specific, a signal including (2×M−1) decision symbols is obtained from a signal including M decision symbols.

503: Perform (1/(1+D)) decoding on the first decision signal to obtain a first decoded signal, and determine the first decoded signal as a second decision signal.

It should be understood that, because the equivalent channel of the FFE is a (1+D) channel, the signal passing through the FFE is equivalent to performing (1+D) encoding on an input signal to obtain the output signal. (1/(1+D)) decoding is performed on the first decision signal in step 503 is to restore the input signal of the FFE. Therefore, to restore the signal, the FFE input signal obtained by performing one or more encoding and decoding operations falls within the protection scope of this application.

For example, if the input signal of the FFE is a (1/(1+D)) precoded signal, and the performing (1/(1+D)) decoding on the first decision signal to obtain a first decoded signal, and determining the first decoded signal as a second decision signal includes: performing (1/(1+D)) decoding on the first decision signal to obtain the first decoded signal: performing (1+D) decoding on the first decoded signal to obtain a second decoded signal; and determining the second decoded signal as the second decision signal. It should be understood that, a plurality of times of precoding may be performed on the input signal of the FFE based on the actual situation in an actual application scenario. Similarly, a plurality of times of decoding may be performed on the decision signal corresponding to the output signal of the FFE. No enumeration is provided herein in this application.

504: If an absolute value of the second decision signal is greater than (M−1), determine that a burst error occurs in the second decision signal.

In an example, when the absolute value of the second decision signal is greater than (M−1) and a level value of the second decision signal is less than 0, (−(M−1)) is selected as a decision symbol in a symbol period in which the burst error occurs. If the level value of the second decision signal is greater than 0, (M−1) is selected as the decision symbol in the symbol period in which the burst error occurs.

Figure 6:
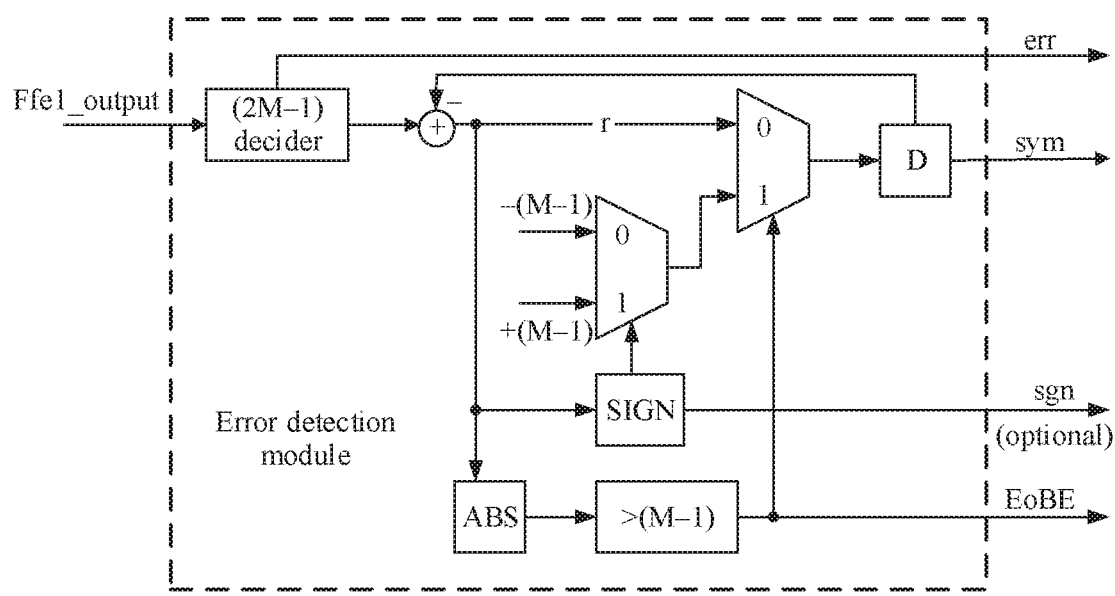
FIG. 6 is a schematic diagram of a structure of error detection in an error correction apparatus according to an embodiment of this application.

FIG. 6 is a schematic diagram of a structure of error detection in an error correction apparatus according to an embodiment of this application. FIG. 6 shows an error detection module based on a (2M−1) decider and a (1/(1+D)) decoder. A selector, a SIGN function module, and an ABS function module are added to the (1/(1+D)) decoder in the error detection module in this embodiment of this application. As shown in FIG. 2, a conventional (1/(1+D)) decoder includes an adder (+) and a register (D). In the error detection module, an output signal ffe_output of the FFE 1 is output to the error detection module, and the (2M−1) decider in the error detection module is configured to perform level decision on the ffe1_output signal. The (1/(1+D)) decoder decodes the decision signal to obtain a pre-output decision signal (r). The selector determines based on the pre-output signal, and selects and outputs a decision signal (sym) of the error detection module. A specific output manner may be: When an absolute value ABS(r) of r is greater than (M−1) and a level value of r is negative, the error detection module outputs (−(M−1)). When the absolute value ABS(r) of r is greater than (M−1) and the level value of r is positive, the error detection module outputs (+(M−1)). When the absolute value ABS(r) of r is less than or equal to (M−1), the error detection module outputs r. err is a difference between the ffe1_output signal and an output signal of the (2M−1) decider. As shown in FIG. 4, the err signal is output to an LMS adaptation module. sgn is an error flag symbol, is obtained through calculation by the symbol function SIGN module, and is used to indicate an error type of the burst error detected by the error detection module. The sgn signal may be output or may not be output based on an actual application scenario. EoBE is a flag signal corresponding to a symbol location at which the burst error ends. When the symbol location at which the burst error ends is detected, EoBE is valid and is 1. When no burst error occurs, EoBE is invalid and is 0.

In the foregoing example, there are two types of burst errors: forward (upward) burst error and backward (downward) burst error. 1. Forward (upward) burst error: The error flag symbol may be 1 or a value of the error flag symbol may be determined based on the r signal having the burst error. 2. Backward (downward) burst error: The error flag symbol may be −1 or a value of the error flag symbol may be determined based on the r signal having the burst error.

505: Correct the burst error in the second decision signal.

In a possible error correction manner, if it is determined that the burst error occurs in the second decision signal, a symbol location of the second decision signal whose absolute value is greater than (M−1) is determined as the symbol location at which the burst error ends, and backtracking and error correction is further performed, based on the output signal and the amplitude value of the FFE and by using a maximum likelihood sequence estimation (maximum likelihood sequence estimation, MLSE) algorithm, on a decision symbol in a $J^{th}$ symbol period in the second decision signal starting from the symbol location at which the burst error ends, to correct the second decision signal. J is a backtracking depth and an integer greater than 1. A value of J may be set based on an actual application scenario. This is not limited in this application.

Figure 7:
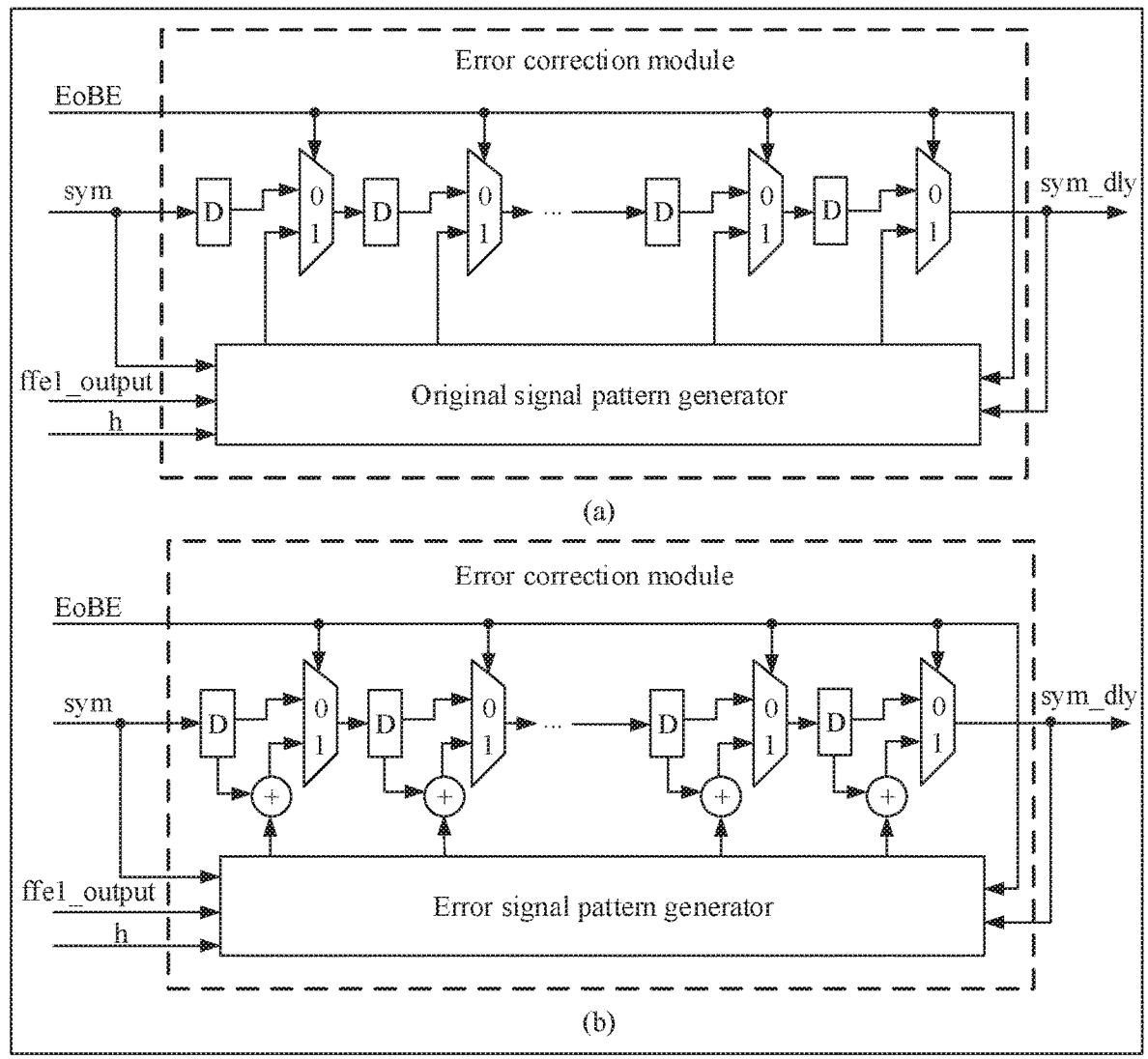
FIG. 7 is a schematic diagram of a structure of error correction in an error correction apparatus according to an embodiment of this application.

FIG. 7 is a schematic diagram of a structure of error correction in an error correction apparatus according to an embodiment of this application. FIG. 7 shows two error correction methods using an MLSE algorithm. (a) in FIG. 7 shows an original signal pattern generator that corrects a burst error in a decision signal having the burst error, to directly obtain a corrected decision signal sym_dly. (b) in FIG. 7 shows an error signal pattern generator. It should be understood that an original signal pattern is a signal sequence including original decision signals, and the original decision signals are signals transmitted by a transmitter to a receiver. Similarly, an error signal pattern is an error decision signal sequence obtained after a burst error occurs. In (a) in FIG. 7, the error detection module outputs the sym signal to the error correction module. When the error detection module does not detect the burst error, the error correction module directly outputs the sym signal. When the error detection module detects the burst error, in other words, when the EoBE signal is valid, the original signal pattern generator is triggered to work. To be specific, the original signal pattern generator obtains the correct decision signal sym_dly through estimation using the MLSE algorithm based on the obtained ffe1_output, sym, and h signals, and finally outputs the sym_dly signal by using an EoBE signal control selector. A difference between (a) and (b) in FIG. 7 lies in that, when the EoBE signal is valid, the error signal image generator is triggered to estimate an error decision signal sequence based on the error flag signal sgn and by using the MLSE algorithm. A corresponding adder (+) further superposes the error decision signal sequence and a sym sequence, to correct the sym signal and obtain the corrected sym_dly signal.

In the error correction method shown in FIG. 7, the EoBE signal is used as an enabling signal or a control signal. The selector and the signal generator (including the original signal pattern generator or the error signal image generator) in the error correction module are triggered to work only when the EoBE signal is valid. In other words, the error correction module performs error correction only when the EoBE signal is valid. If the EoBE signal is invalid, the error correction module does not work. Therefore, the error correction method in this embodiment of this application further reduces power consumption. A lower burst error rate leads to less energy consumption.

It should be understood that, as shown in FIG. 4, in the error correction method shown in (a) in FIG. 7, the ffe1_output signal may be replaced with the adc_output signal or the ffe2_output signal, and the h signal may be replaced with the h' signal. Details are not described herein.

In another possible error correction manner, as described in the example in the step 503, if the input signal of the FFE is a (1/(1+D)) precoded signal, (1+D) decoding is performed on the first decoded signal to obtain the second decoded signal, and the second decoded signal is determined as the second decision signal. In this case, if it is determined that the burst error occurs in the second decision signal, the symbol location of the second decision signal whose absolute value is greater than (M−1) is determined as the symbol location at which the burst error ends. Finally, backtracking and error correction is performed on the decision symbol in the $J^{th}$ symbol period in the second decision signal starting from the symbol location at which the burst error ends, to correct the second decision signal.

Figure 8:
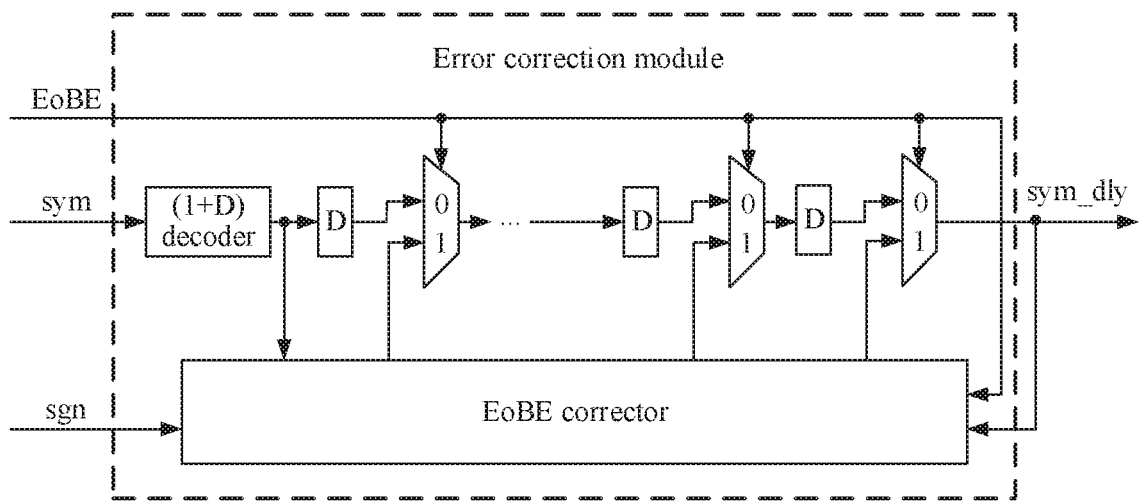
FIG. 8 is a schematic diagram of a structure of error correction in another error correction apparatus according to an embodiment of this application.

For example, FIG. 8 is a schematic diagram of a structure of error correction in another error correction apparatus according to an embodiment of this application. A difference between the error correction apparatus in FIG. 8 and that in FIG. 7 lies in that the error detection module first performs (1+D) decoding on the sym signal obtained by the error correction module, and performs backtracking and error correction on a decision signal obtained after decoding. A specific error correction manner may be: When the EoBE signal is valid, an EoBE corrector is triggered to backtrack and correct the burst error based on the sgn signal, to obtain the corrected decision signal sym_dly.

It should be noted that, in the error correction apparatus shown in FIG. 7 or FIG. 8, a quantity of selectors may be determined based on a value of the backtracking depth J.

In still another possible error correction manner, a similarity between this error correction manner and the foregoing two error correction manners lies in that: The symbol location at which the burst error ends is determined in a same manner. A difference between this error correction manner and the foregoing two error correction manners lies in that: In this error correction manner, backtracking and error correction are performed, based on an error control coding (error control coding, ECC) codeword of the output signal from the FFE, on the decision symbol in the $J^{th}$ symbol period in the second decision signal starting from the symbol location at which the burst error ends, to obtain the corrected second decision signal. ECC is an error control coding method. A specific ECC codeword may be a cyclic redundancy check (cyclic redundancy check, CRC) code, a Reed-Solomon (reed-solomon, RS) code, a BCH block code, or the like. The ECC adds a specific quantity of check bits to a data block, so that the entire codeword complies with a specific operation rule.

It can be easily learned from the foregoing embodiment that, burst error detection is performed on the decision signal corresponding to the FFE by using the error correction method in this embodiment of this application. When it is detected that the burst error occurs, the symbol location at which the burst error ends is determined, and the decision signal is corrected based on the symbol location to obtain the corrected decision signal. Therefore, this reduces a bit error rate of the FFE and improves equalization performance of the FFE.

Further, the error correction module in this embodiment of this application works only when the EoBE signal is valid. If the EoBE signal is invalid, the error correction module does not work. Therefore, the error correction method in this embodiment of this application can save energy and reduce error correction power consumption.

The error correction method in this embodiment of this application is described in detail below with reference to several specific application scenarios. Details are as follows.

An error correction method in an embodiment of this application includes two aspects: burst error location detection and burst error correction. A specific method process is as follows: An NEC apparatus receives a PAM-(2M-1) signal from an FFE, and performs PAM-(2M-1) decision on the PAM-2M-1) signal, performs (1/(1+D)) decoding on a (2M-1) level symbol sequence generated after the decision to restore and obtain a PAM-M sequence, detects whether a burst error occurs during 1/(1+D) decoding, corrects and outputs a burst error symbol sequence if detecting the burst error, and outputs an original decoded symbol sequence of a (1/(1+D)) decoder if detecting no burst error.

Figure 9:
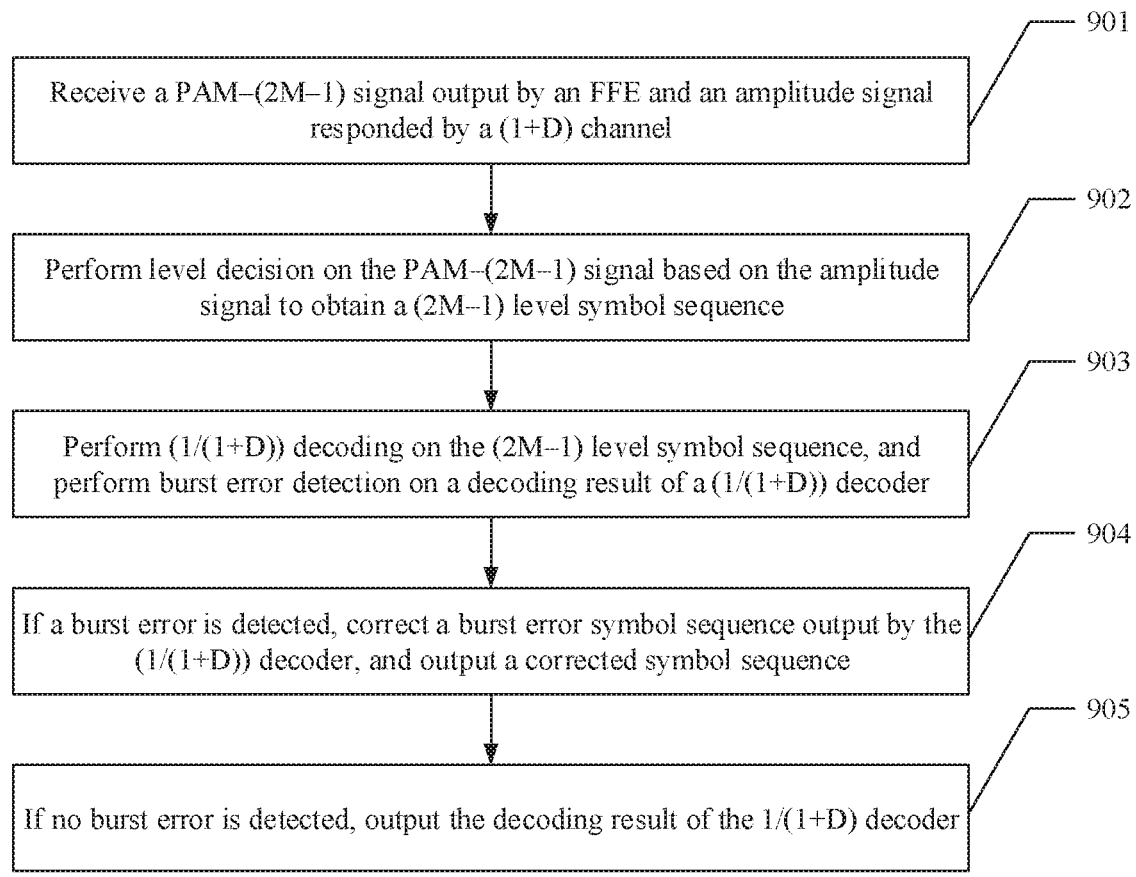
FIG. 9 is a flowchart of another error correction method according to an embodiment of this application.

FIG. 9 is a flowchart of another error correction method according to an embodiment of this application. As shown in FIG. 9, the error correction method includes the following steps.

901: Receive a PAM-(2M-1) signal output by an FFE and an amplitude signal responded by a (1+D) channel.

902: Perform level decision on the PAM-(2M-1) signal based on the amplitude signal to obtain a (2M-1) level symbol sequence.

903: Perform (1/(1+D)) decoding on the (2M-1) level symbol sequence, and perform burst error detection on a decoding result of a (1/(1+D)) decoder.

904: If a burst error is detected, correct a burst error symbol sequence output by the (1/(1+D)) decoder, and output a corrected symbol sequence.

905: If no burst error is detected, output the decoding result of the 1/(1+D) decoder.

The method flowchart shown in FIG. 9 corresponds to the error correction method described in (a) in FIG. 7. Refer to related descriptions of (a) in FIG. 7. It should be understood that, based on (b) in FIG. 7, another method flowchart similar to that in FIG. 9 may be obtained, and details are not described herein again.

Figure 10:
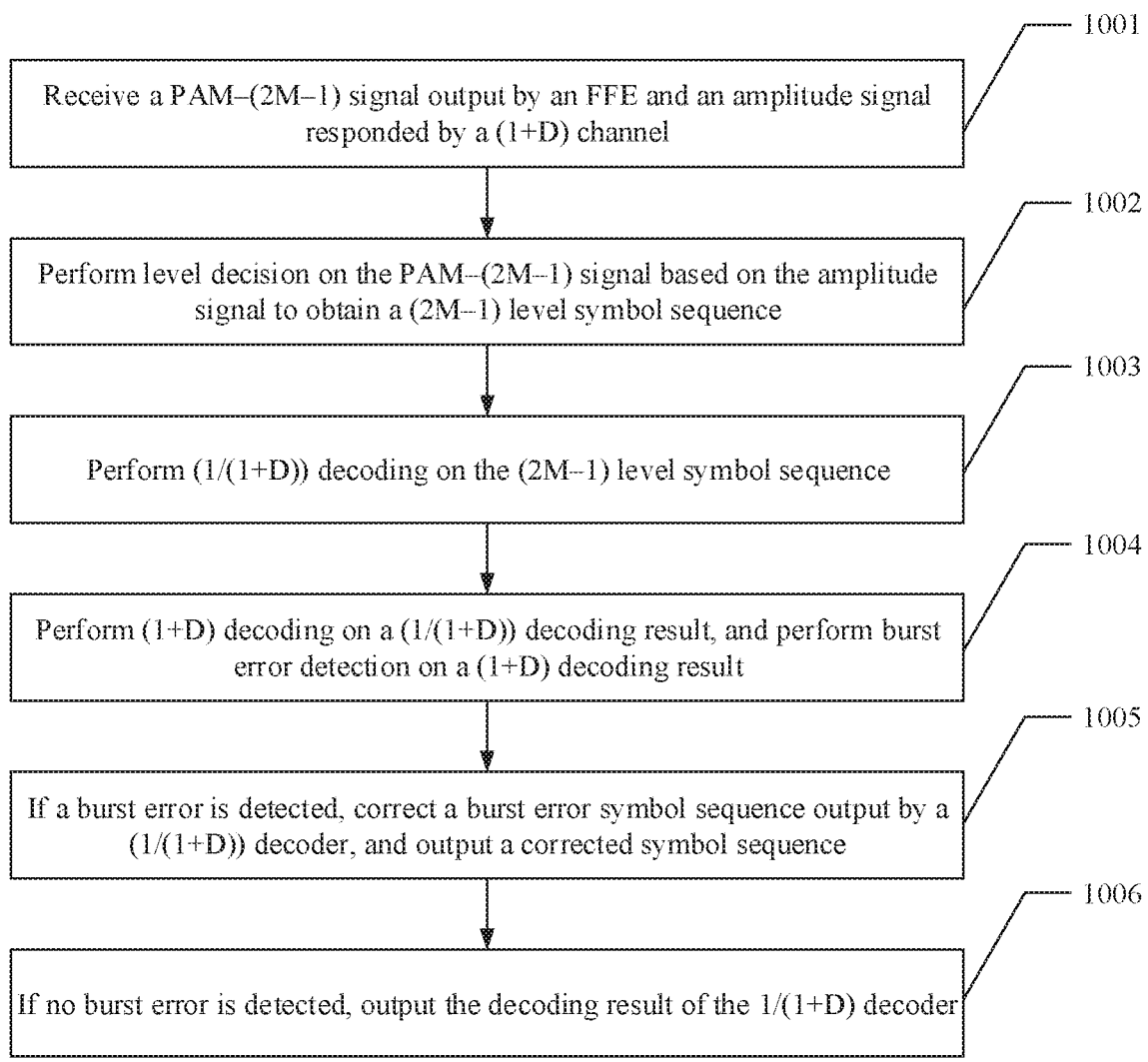
FIG. 10 is a flowchart of another error correction method according to an embodiment of this application.

FIG. 10 is a flowchart of another error correction method according to an embodiment of this application. A difference between this error correction method and that shown in FIG. 9 lies in that: After (1/(1+D)) decoding, (1+D) decoding is first performed on an output sequence, and an obtained (1+D) decoding result is corrected. A specific method process includes the following steps.

1001: Receive a PAM-(2M-1) signal output by an FFE and an amplitude signal responded by a (1+D) channel.

1002: Perform level decision on the PAM-(2M-1) signal based on the amplitude signal to obtain a (2M-1) level symbol sequence.

1003: Perform (1/(1+D)) decoding on the (2M-1) level symbol sequence.

1004: Perform (1+D) decoding on a (1/(1+D)) decoding result, and perform burst error detection on a (1+D) decoding result.

1005: If a burst error is detected, correct a burst error symbol sequence output by a (1/(1+D)) decoder, and output a corrected symbol sequence.

1006: If no burst error is detected, output the decoding result of the 1/(1+D) decoder.

It should be understood that the method process shown in FIG. 10 corresponds to the error correction method shown in FIG. 8. For details, refer to related descriptions in FIG. 8.

In still another application scenario, the correcting, by an error correction module, the burst error symbol sequence based on a check using an error control coding ECC codeword specifically includes: searching for an error pattern after the ECC codeword check is successful, and performing error correction on the burst error symbol sequence. Principles thereof are similar to those shown in FIG. 7 and FIG. 8, and details are not described herein again.

Figure 11:
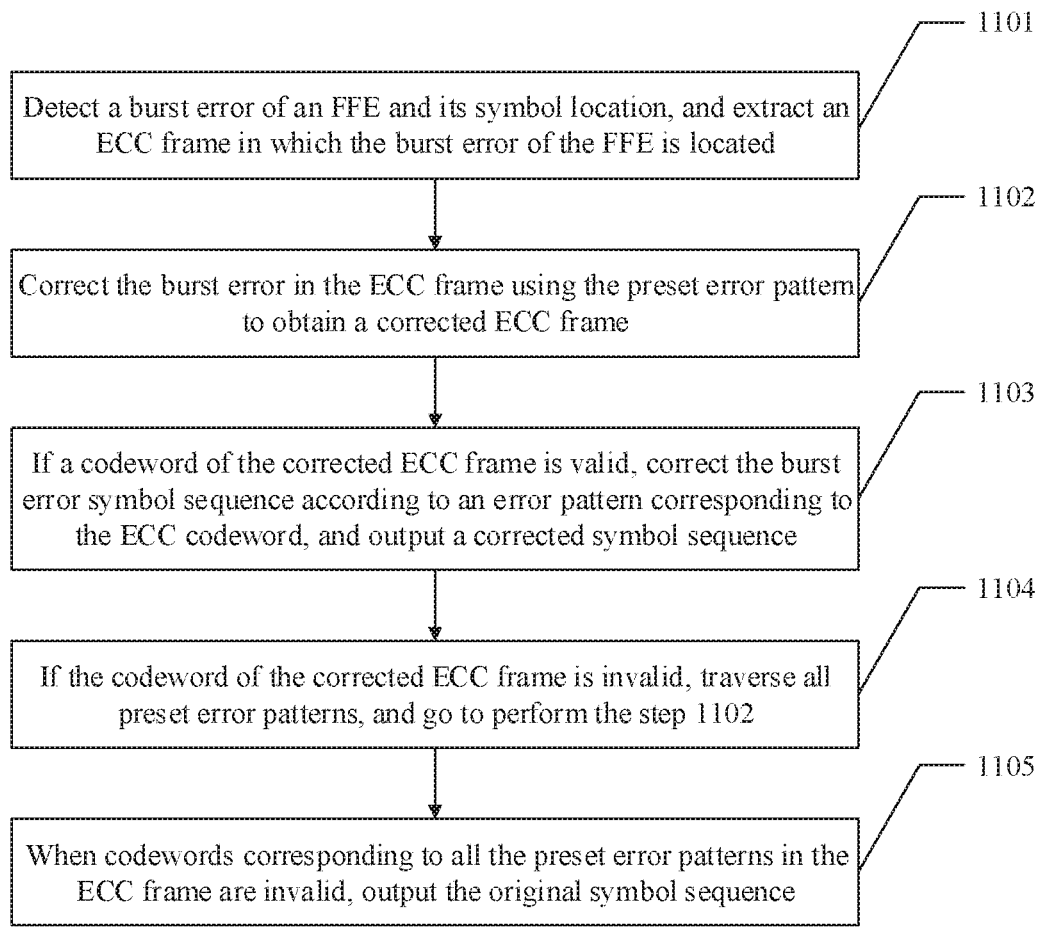
FIG. 11 is a flowchart of another error correction method according to an embodiment of this application.

FIG. 11 is a flowchart of another error correction method according to an embodiment of this application. FIG. 11 shows a process of a method for correcting a burst error by using an ECC codeword. After detecting a symbol location at which the burst error ends, an NEC module extracts the ECC codeword in which the burst error is located, corrects the ECC codeword according to a preset error pattern, and re-checks the ECC. If finding an error pattern after the ECC codeword check is successful, the NEC module corrects a burst error symbol sequence using the error pattern to obtain a corrected symbol sequence. If finding no error pattern, the NEC module outputs an original symbol sequence. The detailed process includes the following steps.

1101: Detect the burst error of an FFE and its symbol location, and extract an ECC frame in which the burst error of the FFE is located.

1102: Correct the burst error in the ECC frame using the preset error pattern to obtain a corrected ECC frame.

1103: If a codeword of the corrected ECC frame is valid, correct the burst error symbol sequence according to an error pattern corresponding to the ECC codeword, and output a corrected symbol sequence.

1104: If the codeword of the corrected ECC frame is invalid, traverse all preset error patterns, and go to perform the step 1102.

1105: When codewords corresponding to all the preset error patterns in the ECC frame are invalid, output the original symbol sequence.

The foregoing description describes the error correction method in the embodiments of this application in detail. The following description describes an error correction apparatus in the embodiments of this application.

Figure 12:
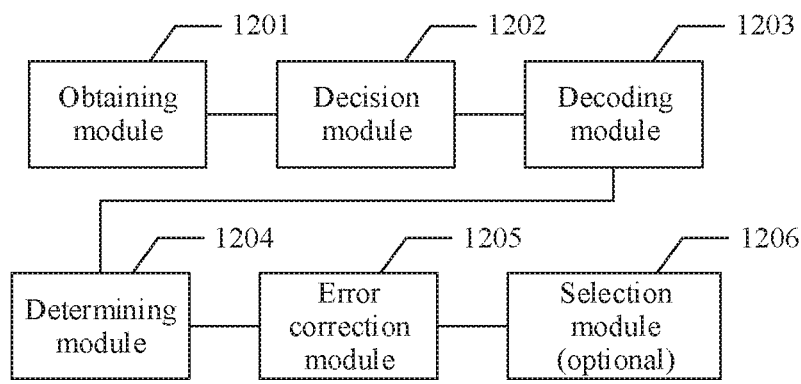
FIG. 12 is a schematic diagram of a structure of an error correction apparatus according to an embodiment of this application.

FIG. 12 is a schematic diagram of a structure of an error correction apparatus according to an embodiment of this application. As shown in FIG. 12, the error correction apparatus includes:

an obtaining module 1201, configured to obtain an output signal and an amplitude value of a feed forward equalizer FFE, where the amplitude value is a channel response amplitude value corresponding to an equivalent channel of the FFE;

a decision module 1202, configured to perform level decision on the output signal based on the amplitude value to obtain a first decision signal, where the first decision signal includes (2M-1) decision symbols, and M is an integer not less than 2;

a decoding module 1203, configured to perform (1/(1+D)) decoding on the first decision signal to obtain a first decoded signal. and determine the first decoded signal as a second decision signal, where the second decision signal includes (M-1) decision symbols:

a determining module 1204, configured to determine, if an absolute value of the second decision signal is greater than (M-1), that a burst error occurs in the second decision signal; and an error correction module 1205, configured to correct the burst error in the second decision signal.

In an example, optionally the error correction apparatus further includes: a selection module 1206, where the selection module 1206 is configured to: if a level value of the second decision signal is negative, select (-(M-1)) as a decision symbol in a symbol period in which the burst error occurs, where (−(M−1)) is a decision symbol with a minimum level value in the second decision signal; or if a level value of the second decision signal is positive, select (+(M−1)) as a decision symbol in a symbol period in which the burst error occurs, where (+(M−1)) is a decision symbol with a maximum level value in the second decision signal.

In an example, optionally the determining module 1204 is further configured to determine a symbol location of the second decision signal whose absolute value is greater than (M−1) as a symbol location at which the burst error ends; and the error correction module 1205 is specifically configured to perform backtracking and error correction on a decision symbol in a $J^{th}$ symbol period in the second decision signal based on the symbol location at which the burst error ends, so as to correct the decision symbol in the $J^{th}$ symbol period in the second decision signal, where J is a preset backtracking depth and an integer greater than 1.

In an example, the error correction module 1205 is specifically configured to perform, based on the output signal and the amplitude value and by using a maximum likelihood sequence estimation MLSE algorithm, backtracking and error correction on the decision symbol in the $J^{th}$ symbol period in the second decision signal starting from the symbol location at which the burst error ends.

In an example, the error correction module 1205 is specifically configured to perform, based on an error control coding ECC codeword of the output signal, backtracking and error correction on the decision symbol in the $J^{th}$ symbol period in the second decision signal starting from the symbol location at which the burst error ends.

In an example, the decoding module 1203 is specifically configured to perform (1/(1+D)) decoding on the first decision signal to obtain the first decoded signal; perform (1+D) decoding on the first decoded signal to obtain a second decoded signal; and determine the second decoded signal as the second decision signal; the error correction module 1205 is specifically configured to: obtain a symbol location at which the burst error ends and an error flag symbol, where the error flag symbol is used to indicate an error type of the burst error; and perform backtracking and error correction on a decision symbol in a $J^{th}$ symbol period in the second decision signal based on the error flag symbol and starting from the symbol location at which the burst error ends, so as to correct the decision symbol in the $J^{th}$ symbol period in the second decision signal, where J is a preset backtracking depth and an integer greater than 1.

In an example, the output signal is any one of a pulse amplitude modulation PAM signal, a quadrature phase shift keying QPSK signal, and a quadrature amplitude modulation QAM signal.

It should be noted that, specific technical features related to the error correction apparatus in FIG. 12 are described in detail in the error correction methods shown in, for example, but are not limited to, FIG. 5, FIG. 9, FIG. 10, and FIG. 11, and details are not described herein again.

Figure 13:
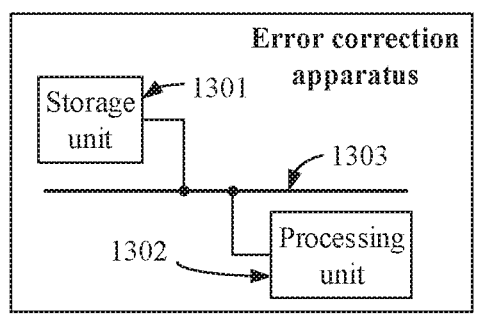
FIG. 13 is a schematic diagram of a structure of another error correction apparatus according to an embodiment of this application.

FIG. 13 is a schematic diagram of a structure of another error correction apparatus according to an embodiment of this application. As shown in FIG. 13, the error correction apparatus includes:

a storage unit 1301, a processing unit 1302, and a bus system 1303, where the bus system 1303 is configured to connect the storage unit 1301 and the processing unit 1302; the storage unit 1301 is configured to store an operation instruction; and the processing unit 1302 is configured to invoke an operation instruction to execute the error correction method corresponding to any one of the foregoing method embodiments.

The error correction apparatus in this embodiment of this application may be a terminal or a chip, and the chip is applicable to an FFE, a partial response receiver, or a high-speed receiver. The error correction apparatus may be another product form, and this is not limited herein.

In an example, the error correction apparatus is a chip. The processing unit 1302 may execute the operation instruction stored by the storage unit 1301, to execute the corresponding error correction method in the foregoing method embodiments. The storage unit 1301 may specifically be a register, a cache, or the like in the chip, or may be a storage unit outside the chip, for example, a read-only memory (read only memory, ROM), or another type of static storage device or a random access memory (random access memory, RAM) that may store static information and an instruction. Optionally, the chip further includes a communications unit. The communications unit may be, for example, an input/output pin, an interface, a circuit, or the like.

In an example, the error correction apparatus is a terminal. The processing unit 1302 in the terminal may be a processor, and the storage unit 1301 may be a memory. The memory may include a read-only memory ROM and a random access memory RAM, and provides an instruction and data for the processor 1302. A part of the memory may further include a non-volatile random access memory (non-volatile random access memory, NVRAM). The memory stores the following elements: an executable module or a data structure, or a subset thereof, or an extended set thereof; an operation instruction, including various operation instructions used to perform various operations; and an operating system, including various system programs used to perform various basic services and process hardware-based tasks.

The processor may also be referred to as a central processing unit (central processing unit, CPU). The memory may include a read-only memory and a random access memory, and provide an instruction and data to the processor. A part of the memory may further include an NVRAM. In a specific application, components in the error correction apparatus are coupled together using a bus system. The bus system may further include a power bus, a control bus, a status signal bus, and the like, in addition to a data bus. However, for clarity of description, various buses are marked as the bus system 1303 in the figure.

The error correction methods disclosed in the foregoing embodiments of this application may be applied to the processor, or may be implemented by the processor. In an implementation process, the steps in the foregoing methods may be completed using an integrated logic circuit of hardware in the processor, or using an instruction in a form of software. The processor may be a general-purpose processor, a digital signal processor (digital signal processor, DSP), an application-specific integrated circuit (application specific integrated circuit, ASIC), a field programmable gate array (field programmable gate array, FPGA) or another programmable logical device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. The software module may be located in a mature storage medium in the art, such as a random access memory, a flash memory, a read-only memory, a programmable read-only memory, or an electrically erasable programmable memory. The storage medium is located in the memory, and the processor reads information from the memory and completes the steps in the foregoing methods in combination with hardware of the processor.

It should be noted that, specific technical features related to the error correction apparatus in FIG. 13 are described in detail in the error correction methods shown in, for example, but are not limited to, FIG. 5, FIG. 9, FIG. 10, and FIG. 11, and details are not described herein again.

An embodiment of this application provides a computer storage medium. The computer storage medium includes an operation instruction. When the operation instruction runs on a computer, the computer is enabled to perform all operations described in the foregoing error correction methods. The computer storage medium may specifically be the storage unit 1301.

An embodiment of this application further provides a computer program product. When the computer program product runs on a computer, the computer is enabled to perform all operations described in the foregoing error correction methods.

It may be clearly understood by a person skilled in the art that, for convenient and brief description, for a specific working process of the foregoing system, apparatus, and unit, refer to a corresponding process in the foregoing method embodiments. Details are not described herein.

In the several embodiments of this application, it should be understood that the disclosed system, apparatus, and method may be implemented in other manners. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electrical, mechanical, or another form.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An error correction method, comprising:
    obtaining an output signal and an amplitude value of a feed forward equalizer (FFE), wherein the amplitude value is a channel response amplitude value corresponding to an equivalent channel of the FFE;
    performing level decision on the output signal based on the amplitude value to obtain a first decision signal, wherein the first decision signal comprises (2M−1) decision symbols, where M is an integer not less than 2;
    performing (1/(1+D)) decoding on the first decision signal to obtain a first decoded signal, and determining a second decision signal based on the first decoded signal, wherein D represents a register, and wherein the second decision signal comprises (M−1) decision symbols;
    in response to determining that an absolute value of the second decision signal is greater than (M−1), determining that a burst error occurs in the second decision signal; and
    correcting the burst error in the second decision signal.

2. The method according to claim 1, wherein:
    in response to determining that the absolute value of the second decision signal is greater than (M−1), the method further comprises one of:
        if a level value of the second decision signal is negative, selecting (−(M−1)) as a decision symbol in a symbol period in which the burst error occurs, wherein (−(M−1)) is a decision symbol with a minimum level value in the second decision signal; or
        if a level value of the second decision signal is positive, selecting (+(M−1)) as a decision symbol in a symbol period in which the burst error occurs, wherein (+(M−1)) is a decision symbol with a maximum level value in the second decision signal.

3. The method according to claim 1, wherein:
    in response to determining that the absolute value of the second decision signal is greater than (M−1), the method further comprises:
        determining a symbol location of the second decision signal whose absolute value is greater than (M−1) as a symbol location at which the burst error ends; and
        the correcting the burst error in the second decision signal comprises:
            performing backtracking and error correction on a decision symbol in a $J^{th}$ symbol period in the second decision signal based on the symbol location at which the burst error ends, to correct the decision symbol in the $J^{th}$ symbol period in the second decision signal, wherein J represents a preset backtracking depth and is an integer greater than 1.

4. The method according to claim 3, wherein the performing backtracking and error correction on a decision symbol in a $J^{th}$ symbol period in the second decision signal based on the symbol location at which the burst error ends comprises:
    performing, based on the output signal and the amplitude value and by using a maximum likelihood sequence estimation (MLSE) algorithm, the backtracking and error correction on the decision symbol in the $J^{th}$ symbol period in the second decision signal starting from the symbol location at which the burst error ends.

5. The method according to claim 3, wherein the performing backtracking and error correction on a decision symbol in a $J^{th}$ symbol period in the second decision signal based on the symbol location at which the burst error ends comprises:
    performing, based on an error control coding (ECC) codeword of the output signal, the backtracking and error correction on the decision symbol in the $J^{th}$ symbol period in the second decision signal starting from the symbol location at which the burst error ends.

6. The method according to claim 1, wherein an input signal of the FFE is a (1/(1+D)) precoded signal, and wherein the performing (1/(1+D)) decoding on the first decision signal to obtain a first decoded signal, and determining a second decision signal based on the first decoded signal comprises:
  performing the (1/(1+D)) decoding on the first decision signal to obtain the first decoded signal;
  performing (1+D) decoding on the first decoded signal to obtain a second decoded signal; and
  determining the second decoded signal as the second decision signal;
wherein the correcting the burst error in the second decision signal comprises:
  obtaining a symbol location at which the burst error ends and an error flag symbol, wherein the error flag symbol indicates an error type of the burst error; and
  performing backtracking and error correction on a decision symbol in a $J^{th}$ symbol period in the second decision signal based on the error flag symbol and starting from the symbol location at which the burst error ends, to correct the decision symbol in the $J^{th}$ symbol period in the second decision signal, wherein J represents a preset backtracking depth and is an integer greater than 1.

7. The method according to claim 1, wherein the output signal is at least one of a pulse amplitude modulation (PAM) signal, a quadrature phase shift keying (QPSK) signal, or a quadrature amplitude modulation (QAM) signal.

8. An error correction apparatus, comprising:
  at least one processor; and
  one or more memories coupled to the at least one processor and storing programming instructions for execution by the at least one processor, the programming instructions instructing the at least one processor to perform operations comprising:
    obtaining an output signal and an amplitude value of a feed forward equalizer (FFE), wherein the amplitude value is a channel response amplitude value corresponding to an equivalent channel of the FFE;
    performing level decision on the output signal based on the amplitude value to obtain a first decision signal, wherein the first decision signal comprises (2M−1) decision symbols, and M is an integer not less than 2;
    performing (1/(1+D)) decoding on the first decision signal to obtain a first decoded signal, and determining a second decision signal based on the first decoded signal, wherein D represents a register, and wherein the second decision signal comprises (M−1) decision symbols;
    in response to determining that an absolute value of the second decision signal is greater than (M−1), determining that a burst error occurs in the second decision signal; and
    correcting the burst error in the second decision signal.

9. The error correction apparatus according to claim 8, wherein, in response to determining that the absolute value of the second decision signal is greater than (M−1), the operations further comprise one of:
  if a level value of the second decision signal is negative, selecting (−(M−1)) as a decision symbol in a symbol period in which the burst error occurs, wherein (−(M−1)) is a decision symbol with a minimum level value in the second decision signal; or
  if a level value of the second decision signal is positive, selecting (+(M−1)) as a decision symbol in a symbol period in which the burst error occurs, wherein (+(M−1)) is a decision symbol with a maximum level value in the second decision signal.

10. The error correction apparatus according to claim 8, wherein, in response to determining that the absolute value of the second decision signal is greater than (M−1), the operations comprise:
  determining a symbol location of the second decision signal whose absolute value is greater than (M−1) as a symbol location at which the burst error ends; and
  performing backtracking and error correction on a decision symbol in a $J^{th}$ symbol period in the second decision signal based on the symbol location at which the burst error ends, to correct the decision symbol in the $J^{th}$ symbol period in the second decision signal, wherein J represents a preset backtracking depth and is an integer greater than 1.

11. The error correction apparatus according to claim 10, wherein the performing backtracking and error correction on a decision symbol in a Jth symbol period in the second decision signal based on the symbol location at which the burst error ends comprise:
  performing, based on the output signal and the amplitude value and by using a maximum likelihood sequence estimation (MLSE) algorithm, the backtracking and error correction on the decision symbol in the $J^{th}$ symbol period in the second decision signal starting from the symbol location at which the burst error ends.

12. The error correction apparatus according to claim 10, wherein the performing backtracking and error correction on a decision symbol in a $J^{th}$ symbol period in the second decision signal based on the symbol location at which the burst error ends comprises:
  performing, based on an error control coding (ECC) codeword of the output signal, the backtracking and error correction on the decision symbol in the $J^{th}$ symbol period in the second decision signal starting from the symbol location at which the burst error ends.

13. The error correction apparatus according to claim 8, wherein an input signal of the FFE is a (1/(1+D)) precoded signal, and the operations comprise:
  performing (1/(1+D)) decoding on the first decision signal to obtain the first decoded signal;
  performing (1+D) decoding on the first decoded signal to obtain a second decoded signal;
  determining the second decoded signal as the second decision signal;
  obtaining a symbol location at which the burst error ends and an error flag symbol, wherein the error flag symbol indicates an error type of the burst error; and
  performing backtracking and error correction on a decision symbol in a $J^{th}$ symbol period in the second decision signal based on the error flag symbol and starting from the symbol location at which the burst error ends, to correct the decision symbol in the $J^{th}$ symbol period in the second decision signal, wherein J represents a preset backtracking depth and is an integer greater than 1.

14. The error correction apparatus according to claim 8, wherein the output signal is at least one of a pulse amplitude modulation (PAM) signal, a quadrature phase shift keying (QPSK) signal, or a quadrature amplitude modulation (QAM) signal.

15. A non-transitory computer-readable storage medium, comprising programming instructions for execution by at least one processor, the programming instructions instructing the at least one processor to perform operations comprising:
- obtaining an output signal and an amplitude value of a feed forward equalizer (FFE), wherein the amplitude value is a channel response amplitude value corresponding to an equivalent channel of the FFE;
- performing level decision on the output signal based on the amplitude value to obtain a first decision signal, wherein the first decision signal comprises (2M−1) decision symbols, and M is an integer not less than 2;
- performing (1/(1+D)) decoding on the first decision signal to obtain a first decoded signal, and determining a second decision signal based on the first decoded signal, wherein D represents a register, and wherein the second decision signal comprises (M−1) decision symbols;
- in response to determining that an absolute value of the second decision signal is greater than (M−1), determining that a burst error occurs in the second decision signal; and
- correcting the burst error in the second decision signal.

16. The non-transitory computer-readable storage medium according to claim 15, wherein, in response to determining that the absolute value of the second decision signal is greater than (M−1), the operations further comprise one of:
- if a level value of the second decision signal is negative, selecting (−(M−1)) as a decision symbol in a symbol period in which the burst error occurs, wherein (−(M−1)) is a decision symbol with a minimum level value in the second decision signal; or
- if a level value of the second decision signal is positive, selecting (+(M−1)) as a decision symbol in a symbol period in which the burst error occurs, wherein (+(M−1)) is a decision symbol with a maximum level value in the second decision signal.

17. The non-transitory computer-readable storage medium according to claim 15, wherein, in response to determining that the absolute value of the second decision signal is greater than (M−1), the operations comprise:
- determining a symbol location of the second decision signal whose absolute value is greater than (M−1) as a symbol location at which the burst error ends; and
- performing backtracking and error correction on a decision symbol in a Jth symbol period in the second decision signal based on the symbol location at which the burst error ends, to correct the decision symbol in the Jth symbol period in the second decision signal, wherein J represents a preset backtracking depth and is an integer greater than 1.

18. The non-transitory computer-readable storage medium according to claim 17, wherein the performing backtracking and error correction on a decision symbol in a Jth symbol period in the second decision signal based on the symbol location at which the burst error ends comprises at least one of:
- performing, based on the output signal and the amplitude value and by using a maximum likelihood sequence estimation (MLSE) algorithm, the backtracking and error correction on the decision symbol in the Jth symbol period in the second decision signal starting from the symbol location at which the burst error ends, or
- performing, based on an error control coding (ECC) codeword of the output signal, the backtracking and error correction on the decision symbol in the Jth symbol period in the second decision signal starting from the symbol location at which the burst error ends.

19. The non-transitory computer-readable storage medium according to claim 15, wherein an input signal of the FFE is a (1/(1+D)) precoded signal, and the operations comprise:
- performing (1/(1+D)) decoding on the first decision signal to obtain the first decoded signal;
- performing (1+D) decoding on the first decoded signal to obtain a second decoded signal;
- determining the second decoded signal as the second decision signal;
- obtaining a symbol location at which the burst error ends and an error flag symbol, wherein the error flag symbol indicates an error type of the burst error; and
- performing backtracking and error correction on a decision symbol in a $J^{th}$ symbol period in the second decision signal based on the error flag symbol and starting from the symbol location at which the burst error ends, to correct the decision symbol in the $J^{th}$ symbol period in the second decision signal, wherein J represents a preset backtracking depth and is an integer greater than 1.

20. The non-transitory computer-readable storage medium according to claim 15, wherein the output signal is at least one of a pulse amplitude modulation (PAM) signal, a quadrature phase shift keying (QPSK) signal, or a quadrature amplitude modulation (QAM) signal.

* * * * *